(12) United States Patent
Lawless et al.

(10) Patent No.: US 6,411,491 B2
(45) Date of Patent: Jun. 25, 2002

(54) CAPACITIVE ENERGY STORAGE DEVICE AND METHOD OF PRODUCING THE SAME

(75) Inventors: William Nicholas Lawless, Westerville; Charles Frederick Clark, Jr., Columbus, both of OH (US)

(73) Assignee: CeramPhysics, Inc., Westerville, OH (US)

( * ) Notice: Subject to any disclaimer, the term of this patent is extended or adjusted under 35 U.S.C. 154(b) by 0 days.

(21) Appl. No.: 09/916,863

(22) Filed: Jul. 27, 2001

Related U.S. Application Data

(60) Continuation-in-part of application No. 09/559,869, filed on Apr. 26, 2000, which is a division of application No. 09/089,759, filed on Jun. 3, 1998, now abandoned.
(60) Provisional application No. 60/048,688, filed on Jun. 5, 1997.

(51) Int. Cl.[7] .............................. H01G 2/08; H01G 4/06; H01G 4/30
(52) U.S. Cl. .................. 361/276; 361/321.4; 361/301.4
(58) Field of Search .................... 361/277, 321.1–321.5, 361/308.1–308.3, 301.4, 301.2, 311–313, 320; 501/134–139

(56) References Cited

U.S. PATENT DOCUMENTS

| | | |
|---|---|---|
| 3,649,891 A | 3/1972 | Lawless |
| 3,814,999 A | 6/1974 | Lawless et al. |
| 4,545,254 A | 10/1985 | Lawless et al. |
| 4,599,677 A | 7/1986 | Lawless et al. |
| 4,872,086 A | 10/1989 | Huang et al. |
| 5,157,581 A | 10/1992 | Hashemi |
| 5,926,360 A | 7/1999 | Laibowitz et al. |

*Primary Examiner*—Dean A. Reichard
*Assistant Examiner*—Eric Thomas
(74) *Attorney, Agent, or Firm*—Killworth, Gottman, Hagan & Schaeff LLP

(57) ABSTRACT

A capacitive energy storage device for use at cryogenic temperatures is provided including first and second electrode layers having a layer of dielectric material there between. The electrode layers include an electrically conductive material having a formula selected from $YBa_2Cu_3O_x$ and $Bi_2Ca_2Sr_2Cu_3O_y$. A method of storing electrical charge in a capacitive energy storage device is also provided. The method includes the steps of: (i) reducing the temperature of the capacitive energy storage device from a predetermined room temperature to a predetermined cryogenic operating temperature; (ii) applying a first electric field of a first field strength across the dielectric layer, wherein the magnitude of the first field strength is sufficient to cause the storage device to switch from a first operational state to a second operational state, the first operational state is characterized by a first dielectric constant, the second operational state is characterized by a second dielectric constant, and the second dielectric constant is substantially greater than the first dielectric constant; and (iii) charging the capacitive energy storage device in the second operational state.

9 Claims, 2 Drawing Sheets

CAPACITIVE ENERGY STORAGE DEVICE AND METHOD OF PRODUCING THE SAME

CROSS REFERENCE TO RELATED APPLICATIONS

This application is a continuation in part of U.S. application Ser. No. 09/559,869, CAPAICTIVE ENERGY STORAGE DEVICE AND METHOD OF PRODUCING THE SAME, file Apr. 26, 2000, which is a divisional application of U.S. application Serial No. 09/089,759 filed Jun. 3, 1998 now abandoned, which claims the benefit of U.S. Provisional Application Serial No. 60/048,688, CAPACITIVE ENERGY STORAGE AT 77 K, filed Jun. 5, 1997.

BACKGROUND OF THE INVENTION

The present invention relates to capacitive energy storage devices for use at cryogenic temperatures, and in particular to a capacitive energy storage device employing specialized electrode layer materials, a method of manufacturing such a device, and a method of charging such a storage device.

Storing energy in banks of capacitors at room temperature is commonly used in applications where size or weight has not been a major concern. Such capacitor technology is quite advanced. However, where the size and weight of the capacitive energy storage devices are of significance and are desired to be minimized, and where rapid discharge is desired, there are potential benefits to be obtained by capacitive energy storage at cryogenic temperatures.

These potential benefits are due to the fact that dielectric breakdown field strengths of dielectric materials used in capacitors are generally much larger at low temperatures than at room temperatures. Also, the dissipation factor for such dielectric materials generally decreases with decreasing temperature so that dielectric heating is reduced in charge-discharge operations. The dissipation factor is a measure of internal power losses due to electronic conduction through the dielectric. This power loss results in the thermal dissipation of electrical energy which is undesirable because it raises the temperature of the device and degrades its efficiency. The resistivity of metals falls rapidly with decreasing temperature so that Joule heating in metal components is reduced during discharge at cryogenic temperatures. Finally, the thermal conductivity of ceramics increases with decreasing temperatures so that heat transfer within components is improved at cryogenic temperatures.

In capacitive energy storage devices, the Helmholtz free energy density of the dielectric is an important quantity. The larger the Helmholtz free energy density of the dielectric, the greater the energy per unit volume which can be stored. The Helmholtz free energy density is defined by the following equation:

$$\Delta F = \frac{1}{8\pi}\int_0^{E_c^2} \varepsilon\, dE^2 (cgs),$$

where $\Delta F$ is the Helmholtz free energy density, $\varepsilon$ is the dielectric constant of the material, E is the electric field strength, and Ec is the upper limit of electric field strength.

Some studies of capacitive energy storage at cryogenic temperatures have been published. One study dealt with the impregnation of dielectric films with liquid nitrogen or polar liquids. K. N. Mathes and S. H. Minnich, "Cryogenic Capacitor Investigation," Final Report, S-67-1095, May 1965. Three types of materials were investigated at 77 K, and it was concluded that energy densities of approximately 0.6 J/cm³ were possible. Energy density may be defined as the energy per unit volume of a medium.

The use of strontium titanate glass ceramic materials as capacitive energy storage devices at cryogenic temperatures was reported by Lawless, Proc. XIII Int'l. Congress of Refrigeration, Washington, D.C., 1971, Vol. 1, p. 599. Based on measurements of electric field strength and dielectric breakdown at 77 K, it was predicted that energy densities of approximately 5.0 J/cm³ were possible.

However, there is a need in the art for materials which can be used as capacitive energy storage devices and which have even greater energy densities. The size and weight of capacitive energy storage devices could be reduced, providing portability to devices which have been heretofore too large and bulky to be mobile. For example, high powered lasers require massive capacitor banks which are too large and heavy to be moved easily. Capacitive devices having large energy densities could reduce the necessary bulk of the capacitors presently utilized in such applications.

U.S. Pat. No. 4,599,677, CAPACITIVE ENERGY STORAGE DEVICE FOR USE AT CRYOGENIC TEMPERATURES, issued Jul. 8, 1986, the disclosure of which is incorporated herein by reference, teaches a capacitive energy storage device utilizing the following ferroelectric pyrochlore ceramic material as the dielectric:

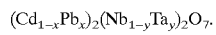

$(Cd_{1-x}Pb_x)_2(Nb_{1-y}Ta_y)_2O_7.$

Alternatively the following non-pyrochlore dielectric materials were identified:

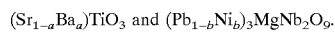

$(Sr_{1-a}Ba_a)TiO_3$ and $(Pb_{1-b}Ni_b)_3MgNb_2O_9.$

These ceramic materials were found to possess unusually large dielectric constants at temperatures in the range of about 50 K to 90 K.

However, even in view of the significant advances introduced by the capacitive energy storage devices described in U.S. Pat. No. 4,599,677, there exists a continuing demand for energy storage devices having improved operating characteristics.

SUMMARY OF THE INVENTION

This demand is met by the present invention wherein a capacitive energy storage device is provided comprising specialized electrode layer materials selected form the group consisting of $YBa_2Cu_3O_x$, and $Bi_2Ca_2Sr_2Cu_3O_y$.

In accordance with one embodiment of the present invention, a capacitive energy storage device for use at cryogenic temperatures is provided comprising first and second electrode layers having a layer of dielectric material there between. The electrode layers comprise an electrically conductive material having a formula selected from the group consisting of: $YBa_2Cu_3O_x$ and $Bi_2Ca_2Sr_2Cu_3O_y$.

Preferably, the electrically conductive material of the electrode layers is selected such that it is capable of functioning as a superconductor at temperatures in the range of about 50 K to about 90 K. Further, the dielectric material preferably exhibits an improved, or a maximum, dielectric constant at temperatures in the range of about 50 K to about 90 K, relative to the dielectric constant of the dielectric material at room temperature.

The dielectric material may have a formula selected from the group consisting of: $(Cd_{1-x}Pb_x)_2(Nb_{1-y}Ta_y)_2O_7$, where x and y are values between about 0 and about 1, $(Sr_{1-a}Ba_a)$ TiO$_3$, where a is a value between about 0 and about 0.5, and (Pb$_{b-1}$Ni$_b$)$_3$MgNb$_2$O$_9$, where b is a value between about 0 and about 1. Additionally, the dielectric material may be a combination of (Sr$_{1-a}$Ba$_a$)TiO$_3$(x), where a is a value between about 0 and about 0.5, and (Pb$_{1-b}$Ni$_b$)$_3$MgNb$_2$O$_9$ (1−x), where b is a value between about 0 and about 1, and x is a mole percentage value between about 5 and about 50, and preferably, from about 40 to about 50. Likewise, capacitors made with the ceramic materials of the preferred embodiment of the present invention possess large energy densities, i.e., approximately 20–25 J/cm$^3$, at temperatures near 77 K (the temperature of liquid nitrogen).

In accordance with another embodiment of the present invention, a method of producing a capacitive energy storage device for use at cryogenic temperatures is provided. The method comprises providing a layer of dielectric material having a pair of opposite substantially parallel major faces, and providing a first electrode layer on one of the major faces. The method further comprises providing a second electrode layer on the other of the major faces, wherein the electrode layers comprise an electrically conductive material, and co-firing the dielectric layer, the first electrode layer, and the second electrode layer for a duration and at a temperature sufficient to sinter the dielectric layer. Preferably, the temperature is between about 950° C. and 1100° C. Further, the steps of providing the first and second electrode layers may comprise providing an electrode layer material slurry. Moreover, the electrically conductive material, for example, and not limited to, may having a formula selected from the group consisting of: YBa$_2$Cu$_3$O$_x$, Bi$_2$Ca$_2$Sr$_2$Cu$_3$O$_y$, and the like.

In accordance with yet another embodiment of the present invention, a capacitive energy storage device for use at cryogenic temperatures is provided comprising: (i) a plurality of electrode layers having at least one layer of dielectric material positioned between respective electrode layers; (ii) additional layers of dielectric material positioned to define respective exterior major faces of the storage device; and (iii) a thermally conductive heat dissipation pad bonded to at least one of the exterior major faces. Preferably, the thermally conductive heat dissipation pad comprises a silver dot.

In accordance with yet another embodiment of the present invention, a method of storing electrical charge in a capacitive energy storage device is provided. The method comprises the steps of: (i) reducing the temperature of the capacitive energy storage device from a predetermined room temperature to a predetermined cryogenic operating temperature; (ii) applying a first electric field of a first field strength across the dielectric layer, wherein the magnitude of the first field strength is sufficient to cause the storage device to switch from a first operational state to a second operational state, the first operational state is characterized by a first dielectric constant, the second operational state is characterized by a second dielectric constant, and the second dielectric constant is substantially greater than the first dielectric constant; and (iii) charging the capacitive energy storage device in the second operational state.

The capacitive energy storage device may be charged in the second operational state by applying a second electric field of a second field strength across the dielectric material after application of the first electric field across the dielectric material. The first electric field may be applied such that the capacitive energy storage device may be charged in the second operational state regardless of the strength of the second electric field. The second dielectric constant is preferably substantially greater than the first dielectric constant at the second field strength and at the first field strength. The predetermined cryogenic operating temperature may be less than approximately 200 K, and is preferably between about 50 K and about 90 K. The first field strength may be approximately 200 kV/cm. The second field strength is typically greater than the first field strength.

In accordance with yet another embodiment of the present invention, a method of producing an improved capacitive energy storage device is provided. The method comprises the steps of: (i) reducing the temperature of the layer of dielectric material from a predetermined room temperature to a predetermined cryogenic operating temperature; and (ii) applying a first electric field of a first field strength across the dielectric layer, wherein the magnitude of the first field strength is sufficient to cause the dielectric layer to switch from a first operational state to a second operational state, the first operational state is characterized by a first dielectric constant, the second operational state is characterized by a second dielectric constant, and the second dielectric constant is substantially greater than the first dielectric constant.

In accordance with yet another embodiment of the present invention, an improved capacitive energy storage device is provided comprising first and second electrode layers having a layer of dielectric material there between, wherein said dielectric material has the formula:

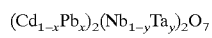

$$(Cd_{1-x}Pb_x)_2(Nb_{1-y}Ta_y)_2O_7$$

where x and y are values between about 0 and about 1, and wherein said capacitive energy storage device is produced by (i) reducing the temperature of the layer of dielectric material from a predetermined room temperature to a predetermined cryogenic operating temperature; and (ii) applying a first electric field of a first field strength across the dielectric layer, wherein the magnitude of the first field strength is sufficient to cause the dielectric layer to switch from a first operational state to a second operational state, the first operational state is characterized by a first dielectric constant, the second operational state is characterized by a second dielectric constant, and the second dielectric constant is substantially greater than the first dielectric constant.

Accordingly, it is an object of the present invention to provide a capacitive energy storage device for use at cryogenic temperatures having improved operational characteristics through proper selection of a material for forming the electrode layers of the device and proper selection of a storage device manufacturing process. It is a further object of the present invention to provide an improved method of charging such a charge storage device. Other objects of the present invention will be apparent in light of the description of the invention embodied herein.

BRIEF DESCRIPTION OF THE DRAWINGS

The following detailed description of the preferred embodiments of the present invention can be best understood when read in conjunction with the following drawings.

DETAILED DESCRIPTION OF THE PREFERRED EMBODIMENTS

Figure 1:
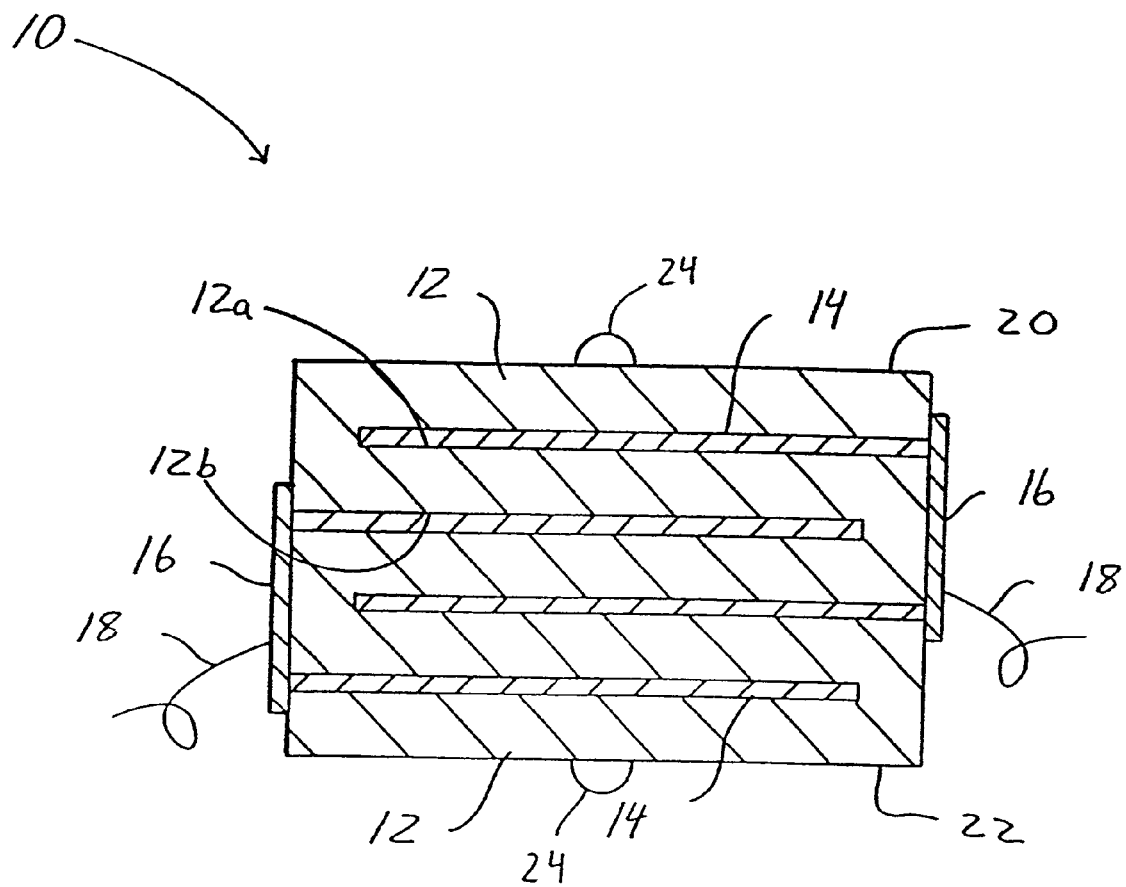
FIG. 1 is a schematic diagram of a typical capacitor structure which may be used in the practice of the present invention.

A typical capacitive energy storage device 10 according to the present invention is illustrated in FIG. 1. The storage device 10 incorporates a multilayer structure comprising dielectric layers 12 with interleaved electrode layers 14. Electrically conductive caps 16 make electrical contact to the electrode layers 14 and to power lines 18. Upon electrical discharge, the energy stored in the ceramic layers 12 is released to the power lines 18 via the electrode layers 14 and conductive caps 16 as a large electromagnetic current pulse. While the device illustrated in FIG. 1 is shown with only a few layers for simplicity and ease of understanding, it will be apparent to those skilled in the art that many more layers may be built up in accordance with these teachings to form more complex multilayered capacitive energy storage devices.

The Helmholtz free energy equation, Equation 1 above, indicates that in order to optimize F, the free energy density, both the upper limit of electric field strength, Ec, and the dielectric constant of a material $\in$, should be as large as possible. Lowering the temperature of a dielectric material will permit increases in the upper limit of electric field strength, Ec. Thus, operation at cryogenic temperatures in the range of about 50 K to about 90 K will permit larger Ec values. A preferred temperature of operation of the device of the present invention is at or near 77 K, the temperature of liquid nitrogen. Liquid nitrogen is inexpensive, readily available, and has a large specific heat in comparison with liquid helium. Of course, operation at other cryogenic temperatures is possible by utilizing materials such as liquid helium or by utilizing improved cryogenic refrigeration devices. For the purposes of describing and defining the present invention, cryogenic temperatures are utilized herein to refer to any temperature, below room temperature, at which the charge storage device exhibits improved operational characteristics.

The material forming the dielectric layers 12 is preferably selected such that it exhibits an improved, or a maximum, dielectric constant at temperatures in the range of about 50 K to about 90 K, relative to the dielectric constant of the dielectric material at room temperature. Specifically, in one embodiment the dielectric material may be selected such that it has a formula is selected from the group consisting of: $(Cd_{1-x}Pb_x)_2(Nb_{1-y}Ta_y)_2O_7$, where x and y are values between about 0 and about 1, $(Sr_{1-a}Ba_a)TiO_3$, where a is a value between about 0 and about 0.5, and $(Pb_{1-b}Ni_b)_3MgNb_2O_9$, where b is a value between about 0 and about 1. In another embodiment, the dielectric material may be a combination of $(Sr_{1-a}Ba_a)TiO_3(x)$, where a is a value between about 0 and about 0.5, and $(Pb_{1-b}Ni_b)_3MgNb_2O_9(1-x)$, where b is a value between about 0 and about 1, and x is a mole percentage value between about 5 and about 50, and preferably, from about 40 to about 50.

The electrode layers 14 comprise an electrically conductive material. For example, and not limited to, the electrically conductive material may having a formula selected from the group consisting of: $YBa_2Cu_3O_x$, where x is a value between about 6.80 and about 6.98, $Bi_2Ca_2Sr_2Cu_3O_y$, where y is about 10.0±0.2, and any other similarly suitable electrically conductive material. Preferably, x is a value of about 6.98. The electrode layers 14 according to the present invention are advantageous because they are capable of functioning as a superconductor at temperatures in the range of about 50 K to about 90 K. As such, they are capable of improving the operating characteristics of the capacitive energy storage device 10.

Referring further to FIG. 1, the capacitive energy storage device 10 of the present invention further comprises additional layers of dielectric material 12 positioned to define respective exterior major faces 20, 22 of the storage device 10. Thermally conductive heat dissipation pads 24 are bonded to respective ones of the exterior major faces 20, 22 to improve heat transfer from the storage device 10 to the associated surrounding cooling medium, e.g., liquid nitrogen. Preferably, the thermally conductive heat dissipation pad comprises a silver dot. It is contemplated by the present invention that the shape and dimensions of the pads 24 may vary according to the cost considerations and design preferences of those practicing the present invention.

A capacitive energy storage device according to the present invention may be produced by providing a layer of dielectric material 12 having a pair of opposite substantially parallel major faces 12a, 12b. First and second electrode layers 14 are provided on the major faces, and the structure comprising the dielectric layer 12 and the electrode layers 14 are co-fired for a duration and at a temperature sufficient to sinter the material of the dielectric layer 12. Typically, the temperature is between about 950° C. and 1100° C. and the duration is approximately 30 minutes. However, it is noted that the duration and temperature vary depending upon the size of the discrete particles forming the dielectric layer 12. Preferably, the electrode layers 14 are provided in the form of an electrode layer material slurry.

A method for optimizing the manufacture and charging of a capacitive energy storage device will now be described in detail. The charge storage device according to this aspect of the present invention comprises a series of electrode layers having respective dielectric material layers positioned therebetween. In one embodiment, the dielectric material has the formula:

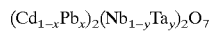

where x and y are values between about 0 and about 1. In another embodiment, the dielectric material may be a combination of $(Sr_{1-a}Ba_a)TiO_3(x)$, where a is a value between about 0 and about 0.5, and $(Pb_{1-b}Ni_b)_3MgNb_2O_9(1-x)$, where b is a value between about 0 and about 1, and x is a mole percentage value between about 5 and about 50, and preferably, from about 40 to about 50. The electrode material may be as described above, or may be any conventional electrode material suitable for use in capacative energy storage, e.g., platinum.

The method for optimizing the manufacture and charging of a capacitive energy storage device comprises the following steps: (i) reducing the temperature of the capacitive energy storage device from a predetermined room temperature to a predetermined cryogenic operating temperature; (ii) applying a first electric field of a first field strength across the dielectric layer; and (iii) charging the capacitive energy storage device in an improved charge storage state, reached as a result of the application of the first electric field.

The predetermined cryogenic operating temperature is less than approximately 200 K, is preferably between about 50 K and about 90 K, and most preferably matches the temperature at which the dielectric constant of the dielectric material reaches its maximum. The magnitude of the first field strength is sufficient to cause the storage device to switch operational states, as described below, from a first operational state to a second, improved, operational state. Typically, the first field strength is on the order of approximately 200 kV/cm.

Figure 2:
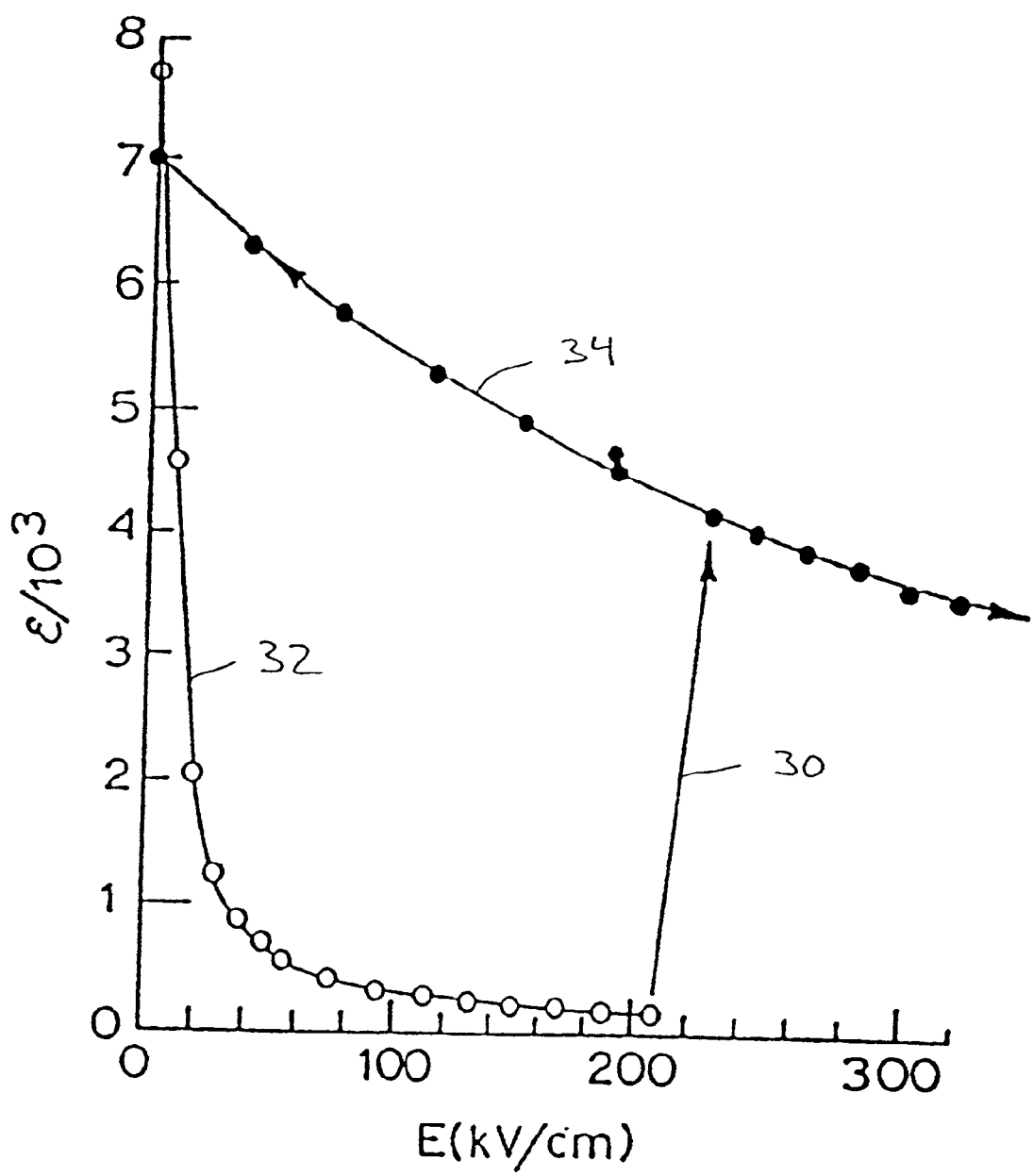
FIG. 2 is a graphical illustration of first and second operational states of a charge storage device according to the present invention.

Referring now to FIG. 2, the transition 30 of a capacitive charge storage device from the first operational state 32 to the second operational state 34 is illustrated. FIG. 2 is a plot of the dielectric constant as a function of the magnitude of the electric field applied across the dielectric, in terms of kV per cm of dielectric layer thickness. The data points for the first operational state 32 were collected by gradually stepping-up the electric field applied across the dielectric and monitoring the dielectric constant. As FIG. 2 illustrates, when the electric field reached about 200 kV/cm, the dielectric constant increased dramatically at the transition 30. Subsequent to the transition 30, the dielectric constant of the material fell exclusively within the higher, second state values, regardless of the strength of the applied electric field. Optimum charging may then be executed within the second state 34 at any of a variety of electric field strengths. Accordingly, the present invention utilizes the capacitive state switching phenomena to provide for a method of manufacturing a capacitive charge storage device with a vastly improved dielectric constant and a method of charging a capacitive charge storage device at an optimum dielectric constant.

The capacitive energy storage device is charged in the second operational state by applying a second electric field of a second field strength across the dielectric material after application of the first electric field across the dielectric material. The second field strength may be equal to or less than the first field strength; however, to optimize charge storage density, the second field strength is typically selected to be greater than the first field strength.

As is illustrated in FIG. 2, at about 200 kV/cm, the first operational state 32 is characterized by a first dielectric constant and the second operational state 34 is characterized by a second dielectric constant that is greater than the first dielectric constant. The second dielectric constant is substantially greater than the first dielectric constant across a wide range of applied electric field strengths.

It is noted that a certain degree of uncertainty is associated with the transition from the first state 32 to the second state 34 of the capacitive charge storage device. Specifically, some storage devices constructed according to the present invention, may not exhibit the state switching described herein, most probably due to inherent, possibly uncontrollable, variances in the structural characteristics of the materials chosen to form the charge storage device of the present invention. An example of a charge storage device that exhibited the state switching effect upon application of the first electric field, as described above, is a multilayer capacitor manufactured as described in the following paragraph.

In one embodiment, precursor ceramic materials were mixed in the correct proportions to produce a dielectric having the formula $(Cd_{1-x}Pb_x)_2(Nb_{1-y}Ta_y)_2O_7$, where x=0.17 and y=0. In another embodiment, precursor ceramic materials were mixed in correct proportions to produce a dielectric of $(Sr_{1-a}Ba_a)TiO_3(x)$, where a=0, and $(Pb_{1-b}Ni_b)_3MgNb_2O_9(1-x)$, where b=0, and x is a mole percentage value between from about 40 to about 50. The dielectric material was then calcined using standard ceramic techniques. The material was then milled to a fine grain size and mixed with binders commonly used to produce multilayer capacitors. The resulting slurry was tape-cast using standard techniques, the tape was dried, and sections of the tapes (squares 1"–2" on a side) were stacked into multiple layers. As the dielectric layers were stacked, platinum layers were applied to the dielectric layers to form electrodes. After assembly of the respective layers was completed, pressure was applied to the stack and the assemblies were sintered using standard sintering techniques. When sintering was completed, the tapes were diced into individual capacitors with the following dimensions: width and length, about 0.97 cm; thickness, about 0.21 cm. Each capacitor included 19 individual dielectric layers, each having a thickness of about 0.00266 cm.

Having described the invention in detail and by reference to preferred embodiments thereof, it will be apparent that modifications and variations are possible without departing from the scope of the invention defined in the appended claims.

What is claimed is:

1. A capacitive energy storage device for use at cryogenic temperatures comprising at least first and second electrode layers having a layer of dielectric material there between, said electrode layers comprising an electrically conductive material selected such that it is capable of functioning as a superconductor at temperatures in the range of about 50 K to about 90 K, and said dielectric material is a combination of materials having the formulas of $(Sr_{1-a}Ba_a)TiO_3(z)$, where a is a value between about 0 and about 0.5, and $(Pb_{1-b}Ni_b)_3MgNb_2O_9(1-z)$, where b is a value between about 0 and about 1, and z is a mole percentage value between about 5 and about 50.

2. A capacitive energy storage device as claimed in claim 1 wherein said electrically conductive material is a material having a formula selected from the group consisting of $YBa_2Cu_3O_x$ and $Bi_2Ca_2Sr_2Cu_3O_y$.

3. A capacitive energy storage device as claimed in claim 2 where x is a value between about 6.80 and about 6.98.

4. A capacitive energy storage device as claimed in claim 2 where y is about 10.0±0.2.

5. A capacitive energy storage device as claimed in claim 2 where x is a value of about 6.98.

6. A capacitive energy storage device as claimed in claim 1 wherein said mole percentage value (z) of said dielectric material is between about 40 and about 50.

7. A capacitive energy storage device as claimed in claim 1 wherein said at least first and second electrode layers are a plurality of electrode layers having at least one layer of said dielectric material positioned between respective electrode layers.

8. A capacitive energy storage device as claimed in claim 7 wherein additional layers of said dielectric material are positioned to define respective exterior major faces of said storage device, and a thermally conductive heat dissipation pad is bonded to at least one of said exterior major faces.

9. A capacitive energy storage device as claimed in claim 8 wherein said thermally conductive heat dissipation pad comprises a silver dot.

* * * * *